US006100899A

United States Patent [19]

Ameline et al.

[11] Patent Number: 6,100,899

[45] Date of Patent: Aug. 8, 2000

[54] SYSTEM AND METHOD FOR PERFORMING HIGH-PRECISION, MULTI-CHANNEL BLENDING USING MULTIPLE BLENDING PASSES

[75] Inventors: Ian R. Ameline, Toronto; Ron Janzen, Aurora, both of Canada

[73] Assignee: Silicon Graphics, Inc., Mountain View, Calif.

[21] Appl. No.: 08/942,492

[22] Filed: Oct. 2, 1997

[51] Int. Cl.[7] .......... G06T 15/00

[52] U.S. Cl. .......... 345/431; 345/435

[58] Field of Search .......... 345/435, 431, 345/150, 115, 113

[56] References Cited

U.S. PATENT DOCUMENTS 5,548,694 8/1996 Gibson .......... 395/124

5,896,136 4/1999 Augustine et al. .......... 345/431

OTHER PUBLICATIONS

"Interactive Computer Graphics: A top–down Approach with OpenGL" —Edward Angel, Section 10.8.3, 10.8.1, 10.6.1, 10.2.2, 1997.

*Primary Examiner*—Mark K. Zimmerman
*Assistant Examiner*—Mano Padmanabhan
*Attorney, Agent, or Firm*—Sterne, Kessler, Goldstein & Fox P.L.L.C.

[57] ABSTRACT

A high-precision multi-channel blending operation replaces a single pass blending operation to overcome distortions resulting from an insufficient number of bits available per pixel in a hardware frame buffer. A desired frame buffer configuration, with a fewer number of channels, and a larger number of bits available per channel than available for a single pass blending operation, is specified and allocated in memory. The same, fewer number of channels from a destination image are written into the frame buffer. The frame buffer is configured for blending, and the same, fewer number of channels from the source image are blended into the frame buffer. The contents of the frame buffer is written into a memory location. The above steps are repeated, until all of the channels have been blended and written into different parts of memory. The channel information from the memory locations are combined to form an image having a user-desired bit resolution.

22 Claims, 12 Drawing Sheets

(2 of 12 Drawing Sheet(s) Filed in Color)

SYSTEM AND METHOD FOR PERFORMING HIGH-PRECISION, MULTI-CHANNEL BLENDING USING MULTIPLE BLENDING PASSES

BACKGROUND OF THE INVENTION

1. Field of the Invention

The present invention relates to the field of computer graphics. Specifically, the present invention relates to high-precision blending and rendering operations in computer graphics.

2. Related Art

Graphics software provides modern graphics artists seemingly unlimited opportunities for providing realistic two- and three-dimensional textured color graphics. Unfortunately, the graphics software, more precisely software interfaces that support graphics hardware, are often limited by the graphics capabilities of the hardware platform.

StudioPaint™ is a well known and highly regarded drawing application that uses the OpenGL™ software interface for graphics. StudioPaint has numerous functions, such as an airbrush paint program that permits a graphics artist to paint computerized objects similarly to using a real paint spray.

When StudioPaint runs on a twelve bit per channel hardware platform, (such as SGI Infinite Reality Engine™) no blending distortions are viewable from use of such functions as the airbrush paint program. Blending refers to the combining of color layers already sprayed with the airbrush (stored in a frame buffer memory) with additional layers of colors sprayed over these layers. The channels for the RGBA multispectral color model used by StudioPaint are respectively the red, green, and blue channels, representing the image colors, and the alpha channel, representing the image transparency.

On the other hand, if StudioPaint is run, for example, on an 8 bit per channel hardware platform, (such as SGI Impact™ or SGI O2™) then distortions can result. In fact, SGI Impact supports at most three channel blending at twelve bits per channel, not the four RGBA channels needed. The blending distortions result from the fact that with fewer bits, there are fewer possible variations for each of the channel representations. For example, with eight bits used for the red channel, only two hundred fifty six different shades of red (i.e., two to the exponent of eight) are available per pixel. The same principle applies for the other three channels.

There are two specific forms of blending aliasing or distortion viewable upon using the StudioPaint airbrush paint program. As noted, these blending distortions are caused by the fact that fewer color and alpha channel combinations are available when fewer bits are available per channel. The first type of blending distortion is color buildup. For a light shade of a color, it is possible that one of the color channels will reach zero whereas the other color channels will not. If the airbrush is set to such a color mixture, and layers of colors are added on top of one another using the airbrush, the inaccuracy provided by the zero color channel is multiplied with each additional layer. The result is a distorted color caused by the color buildup.

A second blending distortion is known as ringing, which refers to the occurrence of rings of darker paint that show up in an airbrush stroke. The stroke is laid down as a sequence of circular brush stamps, each a circular image that varies in opacity from very transparent at its edge to more opaque at its center. With fewer bits used per channel, as the brush opacity is scaled down (i.e., the brush stamp is very close to being transparent) there are only a handful of different levels of opacity between the center and the edge of the brush stroke. This results in concentric rings of increasing transparency between the center and the edge of the brush stamp, causing interference (or Moire) patterns, some canceling each other out and others adding in the form of dark rings.

There is a need in the computer graphics art to provide two- and three-dimensional textured color graphics via modem graphics software without such blending distortions and the resulting imperfections caused by limited hardware platforms.

SUMMARY OF THE INVENTION

The present invention is a system and method for performing a multiple-channel blending operation at a desired precision. A source image having a given number of channels is blended with a destination image having the same number of channels. The blending operation is performed over a number of passes at the desired precision, instead of by a single pass. This removes the blending distortions resulting from a limited hardware platform, where the hardware fails to support a sufficient number of bits per channel for each pixel in a frame buffer. In a preferred embodiment, the OpenGL software interface in an X Window System is used, although any comparable graphical interface on any similar system can be implemented.

Initially, a frame buffer is prepared for the multiple-channel blending operation. This includes three steps. First, a frame buffer configuration having at least one channel at a desired precision is identified. Second, a number of channels fewer than the total number of channels of the destination image are written into the frame buffer. This is performed by reading pixel data of the destination image and writing the pixel data into the frame buffer.

Third, the frame buffer is configured to perform the blending operation. In this third step, a blending function is set which will be used during the blending operation. For an RGBA multispectral color model system, the blending function can be set to a function of a source image blending factor and a destination image blending factor.

After the frame buffer is prepared for multiple-channel blending, the same channels as noted above (i.e., fewer than the total number of channels) of the source image are blended into the frame buffer to produce a blended channel or channels. In one embodiment, pixel data is read from the source image from memory and this pixel data is blended into the frame buffer. In another preferred embodiment, textured polygons representing the source image are read from memory and these textured polygons are blended into the frame buffer. It will be apparent to those skilled in the relevant art that many other methods of generating pixel data that are to be blended are applicable to the present invention.

The blended channel or channels produced from the multiple-channel blending are then retrieved from the frame buffer and stored. Specifically, the pixel data of the frame buffer is read out of the frame buffer and stored in memory.

The above blending and storing steps are then repeated for the remaining channels of the source image. In other words, for the remaining channels of the source image, each channel is blended into the corresponding channel of the destination image and stored in memory. It is also possible to blend more than one channel at a time and store the resulting more than one channels in memory. More than one channel can be blended if hardware permits more than one channel at the desired precision. For example, it is possible that a hardware frame buffer will support three color channels of an RGBA color model to be blended together with 12 bits per channel accuracy. In this case, three color channels can be blended in a first pass, and stored in memory, and the alpha channel can then be blended in a second pass, and also stored in memory.

As a result of the above steps, two or more blended channels are stored in memory. The last step involves interleaving the channel information (e.g., color channels and alpha channel for an RGBA color model) of each pixel of the stored blended channels to form each pixel of a combined destination image. The pixels of the resulting combined image have more bits dedicated per channel than otherwise possible.

BRIEF DESCRIPTION OF THE FIGURES

The invention is best understood by reference to the figures, wherein references with like reference numbers indicate identical or functionally similar elements. The elements within the figures are functional entities and may or may not be separate physical entities.

The file of this patent contains at least one drawing executed in color. Copies of this patent with color drawing (s) will be provided by the Patent and Trademark Office upon request and payment of the necessary fee.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

I. The Example Environment

Figure 1:
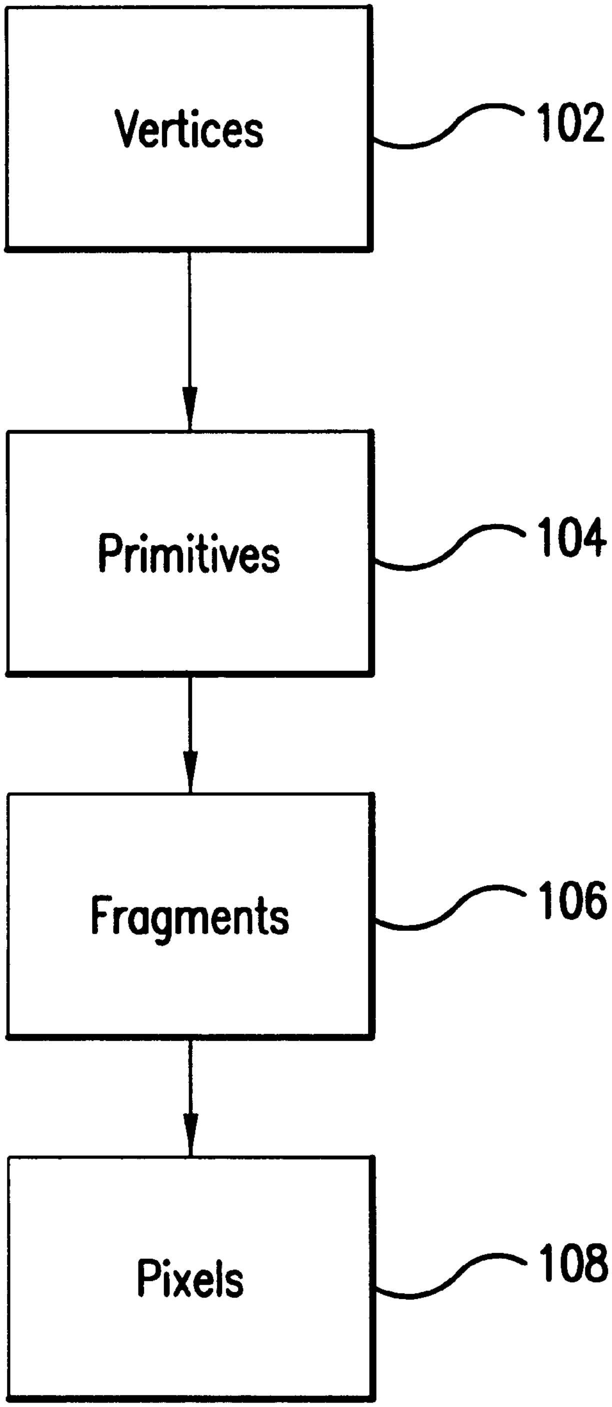
FIG. 1 illustrates an OpenGL pipeline hierarchy.

The present invention is described in terms of an example environment. The example environment uses the OpenGL software interface for graphics hardware. The OpenGL interface consists of hundreds of functions that permit graphics programmers to specify graphical objects. Specifically, OpenGL permits the user programmer to render two and three dimensional objects into a frame buffer for storage as pixels. The resulting pixels are read by hardware that produces a physical display of the pixels. The following references on OpenGL and the X Window System are hereby incorporated by reference in their entirety: OpenGL Reference Manual, Second Edition, Addison-Wesley Developers Press, 1997, ISBN 0-201-46140-4, OpenGL Architecture Review Board: Jackie Neider, Tom Davis, Mason Woo; OpenGL Programming Guide, Addison-Wesley Developers, 1993, ISBN 0-201-63274-8, OpenGL Architecture Review Board: Jackie Neider, Tom Davis, Mason Woo; and OpenGL Programming for the X Window System, Addison-Wesley Developers Press, 1996, ISBN 0-201-48359-9, Mark J. Kilgard.

The example environment also uses the RGBA multispectral color model. The following reference on computer graphics is hereby incorporated by reference in its entirety: Computer Graphics: Principles and Practice, second edition, 1990, ISBN 0-201-12110-7, James Foley, Andries Van Dam, Steven Feiner, John Hughes. Of particular relevance are the following sections: chapter 13 (describing color models and color plates depicting the color models), chapter 17 (describing image processing and storing), particularly subsection 5 (describing existing multipass processing techniques) and subsection 6 (describing blending), and chapters 4 and 18 (describing simple and complex graphics hardware, respectively).

Although the invention is described in terms of this example environment, description in these terms is provided for convenience only. It is not intended that the invention be limited to the application in this example environment. In fact, after reading the following description, it will become apparent to a person skilled in the relevant art how to implement the invention in alternative environments. The same concepts and techniques as used for the present invention can be used for other comparable environments, including other software interfaces to graphics hardware, other operating systems or windowing systems, and other color models. Therefore, for the remainder of the specification the OpenGL graphical interface, the X Window System and the RGBA multispectral color model are described only for exemplary purposes and not by way of limitation to the invention.

II. Background

FIG. 1 illustrates the OpenGL pipeline hierarchy. Initially, vertices 102 describing the shapes of desired geometric objects (points, line segments and polygons) are created. These vertices 102 are assembled into primitives 104, which are geometric objects with edge flags, color and texture information. The primitives 104 are rasterized into two dimensional images called fragments 106, comprising points and associated color, depth and texture data. Finally the fragments 106 are combined into pixels 108 in a frame buffer. Each pixel stores the information of a point on a display.

Figure 2:
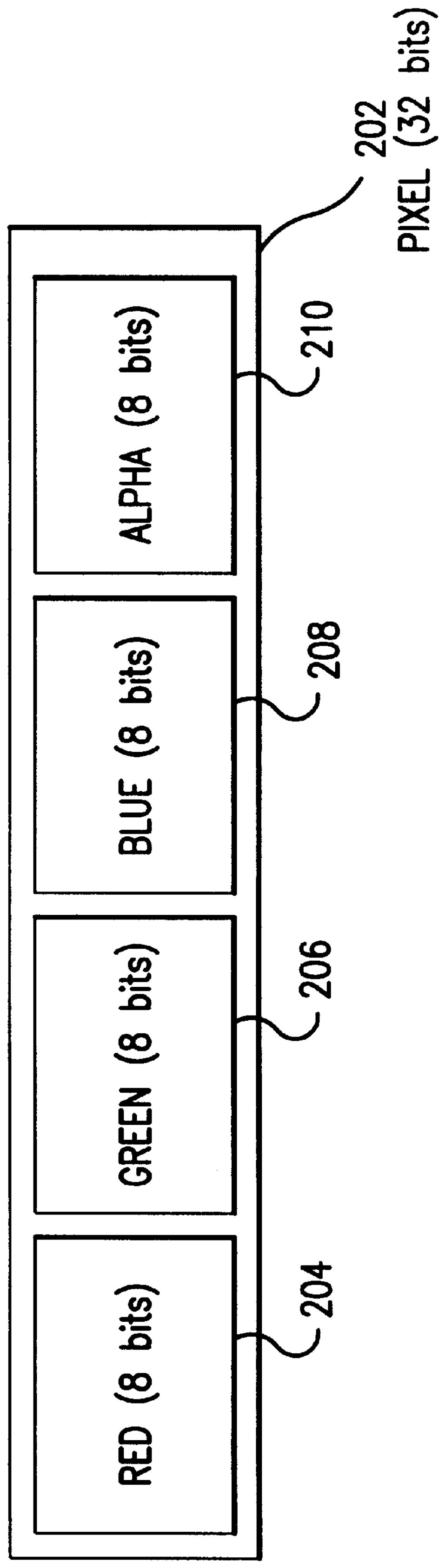
FIG. 2 illustrates an exemplary pixel for an RGBA multispectral color model display.

FIG. 2 illustrates an exemplary pixel 202 for an RGBA multispectral color model display. Pixel 202 stores information from four channels. These four channels are red 204, green 206, blue 208 and alpha 210. The red 204, green 206 and blue 208 channels, comprising 8 bits each, provide image color information. Any color portion of a pixel image can be represented by the combination of red channel 204, green channel 206 and blue channel 208. The alpha channel, also comprising 8 bits, represents the opacity of the pixel image, ranging from opaque to transparent. Accordingly, each pixel 202 is stored in the frame buffer as a combination of these four channels for any RGBA color model system.

Figure 3:
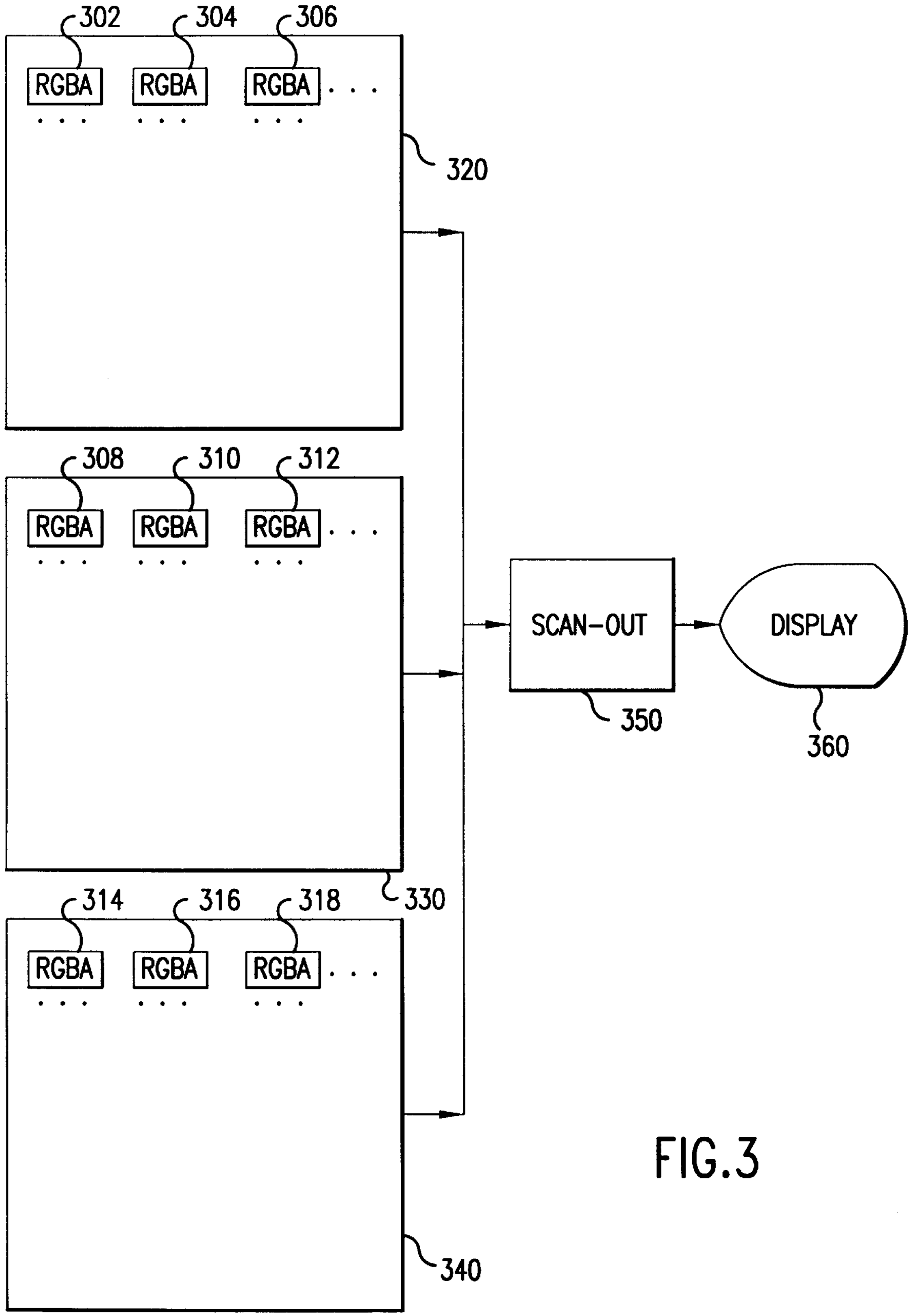
FIG. 3 illustrates an exemplary frame buffer environment.

FIG. 3 illustrates an exemplary frame buffer environment. As shown therein, it is possible to use more than one frame buffer to store the pixels. In fact, FIG. 3 illustrates a first frame buffer 320, a second frame buffer 330 and a third frame buffer 340. Frame buffer 320 comprises numerous pixels, of which pixels 302, 304 and 306 are shown. Similarly, frame buffer 330 includes pixels 308–312 and frame buffer 340 includes pixels 314–318. Each of these frame buffers can store an entire image at any given time.

The frame buffers 320–340 are connected to a hardware scan-out device 350. The scan-out device 350 selectively reads the pixel information from one of the frame buffers 320–340 and transmits it to display 360 for physical display. The pixels comprising the frame buffer being displayed are referred to as an on-screen image, whereas the pixels of the frame buffers not being displayed are referred to as off-screen images. The frame buffers 320–340 can also store pixel information transmitted from other regions of memory or write pixel information to other regions of memory.

Figure 4:
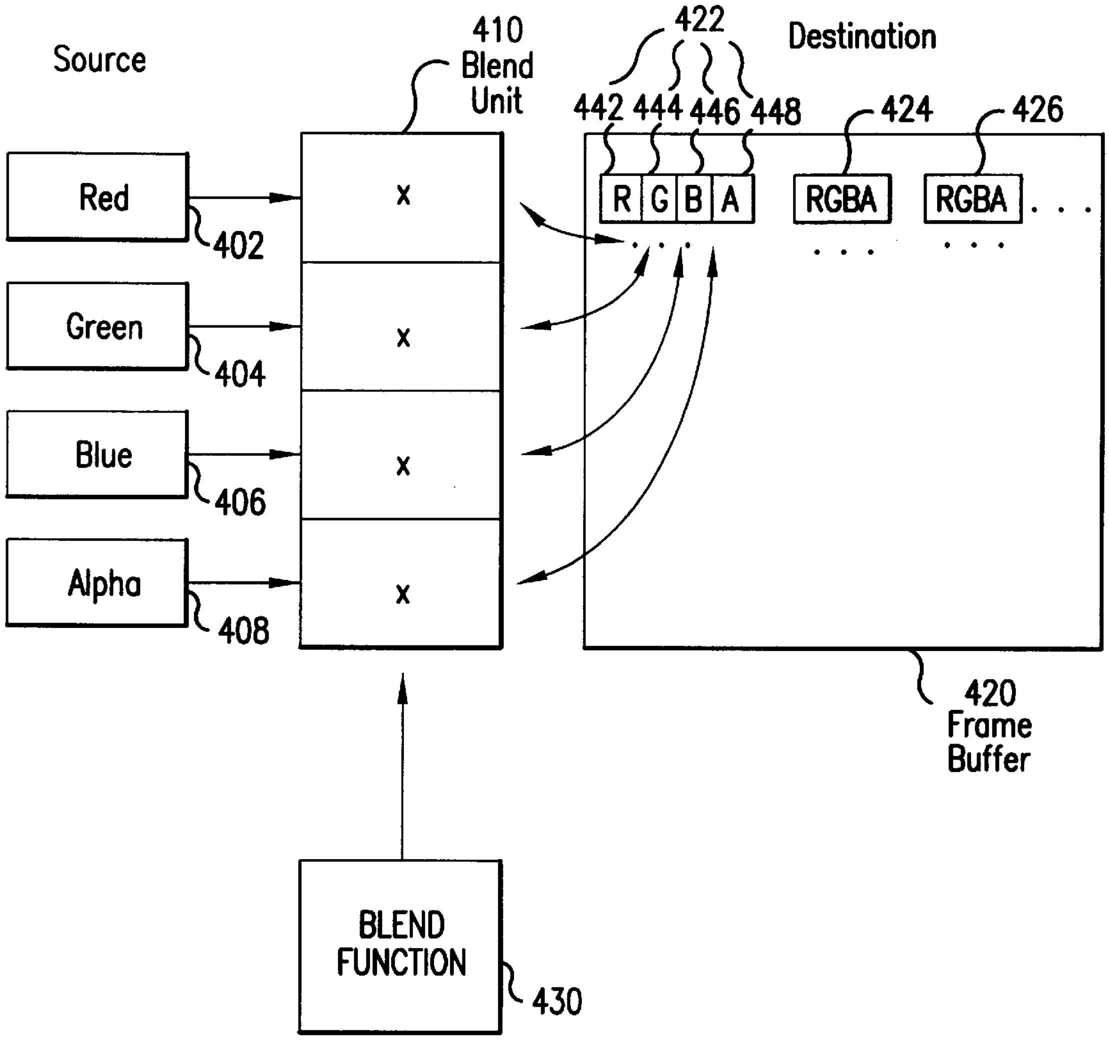
FIG. 4 illustrates an exemplary color blending environment.

FIG. 4 illustrates an exemplary environment wherein color blending occurs. OpenGL offers a blend function glBlendFunc that blends the incoming RGBA values with RGBA values that are already stored in the frame buffer. FIG. 4 shows a source end at the left and a destination end at the right. The source end includes the input channels, namely the red channel 402, the green channel 404, the blue channel 406 and the alpha channel 408. The destination end includes frame buffer 420, which currently stores pixels 422, 424 and 426, in addition to other pixels not shown. Each pixel in the destination frame buffer 420 is said to include a destination red channel, a destination green channel, a destination blue channel, and a destination alpha channel.

The function glBlendFunc accepts as arguments the source blend factor and the destination blend factor. Based on these user-specified values, glBlendFunc sets the blend function for the red (R), green (G), blue (B) and alpha (A) channels as follows:

$$R_d=\min\,(k_R,\,(R_s\times s_R+R_d\times d_R)) \tag{1}$$

$$G_d=\min\,(k_G,\,(G_s\times s_G+G_d\times d_G)) \tag{2}$$

$$B_d=\min\,(k_B,\,(B_s\times s_B+B_d\times d_B)) \tag{3}$$

$$A_d=\min\,(k_A,\,(A_s\times s_A+A_d\times d_A)) \tag{4}$$

Here, $R_d$, $G_d$, $B_d$, and $A_d$ are the destination channels, $R_s$, $G_s$, $B_s$, and $A_s$ are the source channels, $s_R$, $s_G$, $s_B$ and $s_A$ are the source blend factors for the channels, and $d_R$, $d_G$, $d_B$ and $d_A$ are the destination blend factors for the channels. The term $k_{channel}$ has the value $(2^{m\_channel}-1)$ where m_channel is the number of bits assigned to a given channel. FIG. 4 symbolically represents equations (1)–(4) as blend function 430. After the source blend factor and the destination blend factor are set using the glBlendFunc command, OpenGL automatically sets the blend function 430.

Table 1 illustrates the most commonly used blend factors, with symbolic constants in the left column and the corresponding source or destination blend factors in the right column. The notation $(f_R, f_G, f_B, f_A)$ is used to represent that the blend factors are either source blend factors $(s_R, s_G, s_B, s_A)$ or destination blend factors $(d_R, d_G, d_B, d_A)$.

TABLE 1

| symbolic constants | $(f_R, f_G, f_B, f_A)$ |
|---|---|
| GL_ZERO | (0, 0, 0, 0) |
| GL_ONE | (1, 1, 1, 1) |
| GL_SRC_COLOR | $(R_s/k_R, G_s/k_G, B_s/k_B, A_s/k_A)$ |
| GL_ONE_MINUS_SRC_COLOR | $(1,1,1,1)-(R_s/k_R, G_s/k_G, B_s/k_B, A_s/k_A)$ |
| GL_DST_COLOR | $(R_d/k_R, G_d/k_G, B_d/k_B, A_d/k_A)$ |
| GL_ONE_MINUS_DST_COLOR | $(1, 1, 1, 1)\ (R_d/k_R, G_d/k_G, B_d/k_B, A_d/k_A)$ |
| GL_SRC_ALPHA | $(A_S/k_A, A_S/k_A, A_S/k_A, A_S/K_A)$ |
| GL_ONE_MINUS_SRC_ALPHA | $(1, 1, 1, 1)-(A_S/k_A, A_S/k_A, A_S/k_A, A_S/k_A)$ |
| GL_DST_ALPHA | $(A_d/k_A, A_d/k_A, A_d/k_A, A_d/k_A)$ |
| GL_ONE_MINUS_DST_ALPHA | $(1, 1, 1, 1)-(A_d/k_A, A_d/k_A, A_d/k_A, A_d/k_A)$ |

Color blending occurs any time pixels are drawn into the frame buffer 420 after the blending function 430 has been set (using glBlendFunc), and blending has been enabled. (A blend function 430 is composed of a source factor and a destination factor.) For example, one way of drawing pixels into the frame buffer 420 is to use the glDrawPixels function. (Note that other means of drawing pixels into the frame buffer 420 may be used.) The blend unit 410 performs the blending operation by use of eight multipliers and four adders, i.e., by multiplying the source factor 430 by each of the four source channels 402–408, and multiplying the destination factor 430 by each of the four destination channels 442–448, and then performing four additions of these eight results of the multiplications together to produce the 4 channels which shall be written into the frame buffer 420 (as specified in equations 1–4 above), replacing the old values of the destination channels 442–448. Thus the resulting pixel value stored in the frame buffer 420 is a blend of the source image and destination image as controlled by the blend function 430.

As easily observed, in this well known blending function, all four channels are blended together in a single pass. In other words, all four destination channels for a pixel are blended in parallel with the source channels (scaled by the blend function 430) to form the new destination channels for the same pixel. For more information on color image blending or compositing, the reader is referred to: Porter, Thomas and Duff, Tom, Compositing Digital Images, *Computer Graphics*, vol. 18, No. 3 (1984), pp. 253–259.

III. The Present Invention

The single pass blending described above creates notable distortions if there are insufficient bits devoted by the hardware to each channel. Specifically, distortions are created if there are insufficient bits available per channel of each pixel in the frame buffer. For the color buildup and ringing type blending distortions noted above, they are viewable when 8 bits are used per channel in an RGBA multispectral color model, whereas they are not viewable when 12 or more bits are used per channel in the same color model.

To solve the problem for these and any other blending distortions caused by hardware insufficiency, the present invention uses a multi-pass procedure where the user programmer sets a desired precision. In this procedure, the typical blending operation is broken down into two or more passes. In each pass, fewer than the total number of channels available can be blended together, and the results are stored in memory. This is repeated until the blending of all of the channels is completed. At this point, the results of the multiple blendings, stored in memory for each blending operation, are combined to provide a single image having all channels. This resulting image provides a higher per pixel precision.

FIGS. 5A–5H are color illustrations used to show how the present invention removes the color blending and ringing distortions. FIGS. 5A, 5C, 5E and 5G illustrate operation of the conventional one-pass blending technique. FIGS. 5B, 5D, 5F and 5H illustrate operation of the multi-pass method of the invention. Specifically, the red, green and blue channels were blended together into a single frame buffer in a first pass, then the alpha channel was blended into another frame buffer in a second pass, and finally the results of these two blends were combined to form a destination image. The method will become apparent to those skilled in the art from reading the description of FIG. 7 below.

Figure 5A:
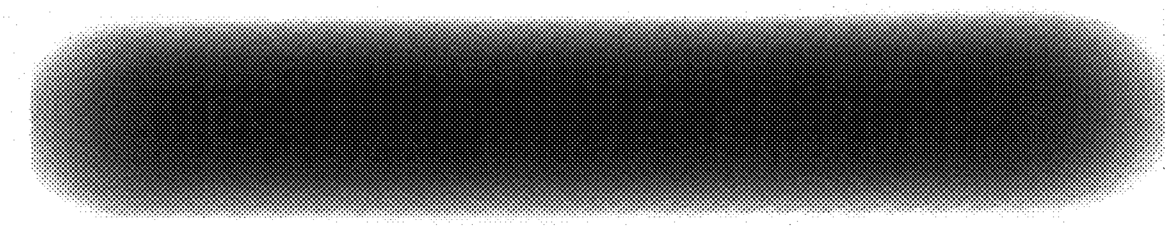
FIGS. 5A, 5B, 5C, 5D, 5E, 5F, 5G and 5H are color illustrations of how the present invention removes color buildup and ringing distortions.
Figure 5B:
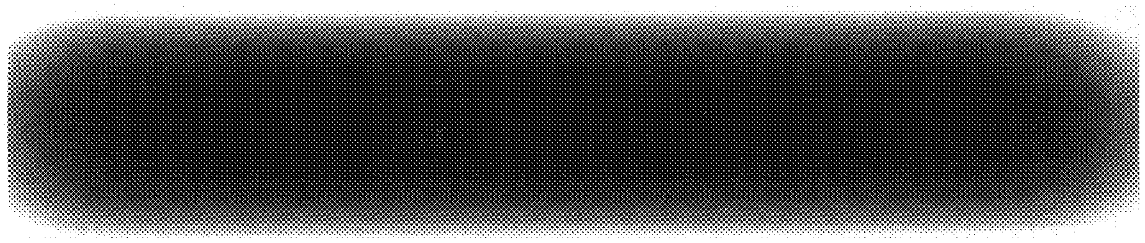

FIG. 5A shows a brush stroke made with a 128 pixel radius brush using 8 bits per channel blending precision. The ringing problem, i.e., concentric rings spanning over the brush stroke, is notable. FIG. 5B shows the same brush stroke made by the method of the invention. The ringing problem has been eradicated.

Figure 5C:
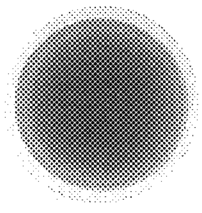
Figure 5D:
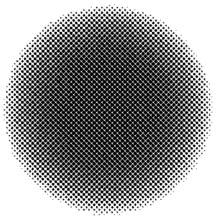

FIG. 5C shows a single brush stamp (same radius) at 8 bits per channel blending precision. The stamp shows visible concentric circles created by the quantization forced on a very transparent brush using only 8 bits per channel blending precision. FIG. 5D shows the same brush stamp made by the method of the invention. Again, the ringing effect has been removed.

Figure 5E:
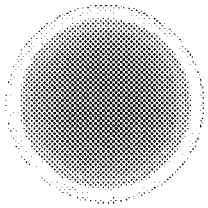
Figure 5F:
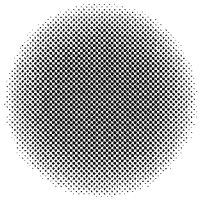

FIG. 5E shows the same brush stamp as in FIG. 5C (8 bits per channel blending precision), but as a color image using all four channels. A color distortion, manifesting itself as different colored rings, is caused by the fact that one of the three color channels falls to zero before the other color channels. As the color builds up, the error becomes more apparent. FIG. 5F shows the same brush stamp made by the method of the invention. The color buildup distortion has been removed.

Figure 5G:
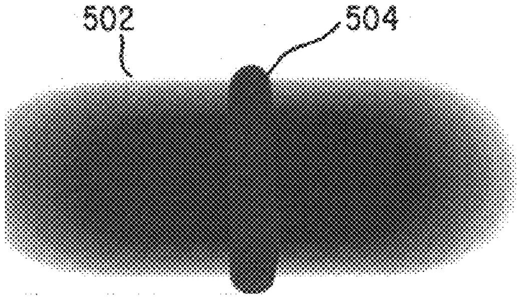
Figure 5H:
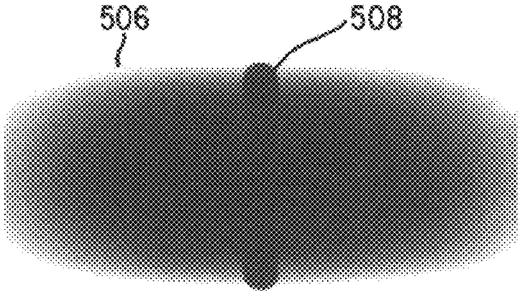

FIG. 5G shows a built-up color brush stroke 502 (8 bits per channel blending precision) made by repeatedly applying the brush over the same area. A solid (i.e., highly opaque) brush stroke 504 of the same color was then stroked vertically over built-up brush stroke 502. A comparison of brush strokes 502 and 504 shows the color buildup distortion created by the repeated stroking, because the colors of repeatedly-applied brush stroke 502 and vertical brush stroke 504 (which does not have a color buildup distortion) are noticeably different. FIG. 5H shows the same color brush strokes, but this time using the method of the invention. Here, the color of a built-up brush stroke 506 is the same as a solid brush stroke 508, and there is no color buildup distortion.

Figure 7:
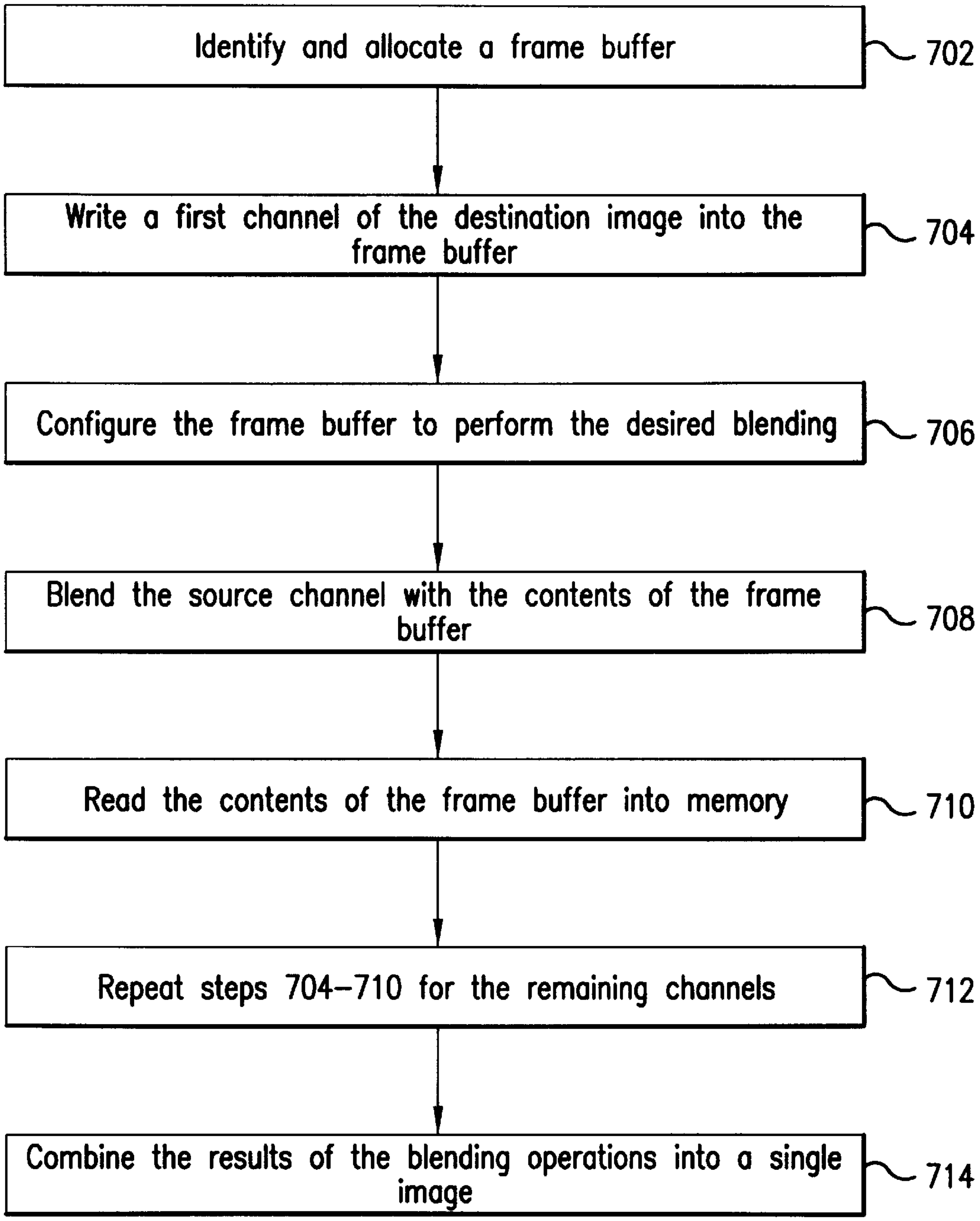
FIG. 7 is a flow chart used to explain the method of the present invention.

FIG. 7 is a flow chart used to explain the method of the present invention. Unlike the method used for FIG. 5, this method uses a single frame buffer to sequentially blend the red, green, blue and alpha channels, respectively. In other words, the color and alpha channels are individually blended into respective frame buffers, rather than blended together. The results from the blend are individually stored in memory, and are combined in a last step.

This example is provided for purposes of illustration. The method of the invention, however, is not limited to this specific implementation. In other words, it is possible to blend the red and green channels in the first pass, the blue and alpha channels in the next pass, and to combine the results of these two blends as a last step. Instead, one can blend the red, green and blue channels in a first pass, and the alpha channel in a second pass, as was performed to produce FIG. 5. In fact, those skilled in the art will recognize the wide variations of blending available.

Note that if a blend factor using destination alpha is used (i.e., one of GL_DST_ALPHA and GL_ONE_MINUS_DST_ALPHA), then the frame buffer must have at least two channels, one of which is an alpha channel. (A two channel frame buffer, where one of the two channels is alpha, is commonly referred to as a "Luminance Alpha frame buffer.") In this case, whenever channels of the destination image are written to the frame buffer, the alpha channel of the destination image must also be supplied. OpenGL supports two pixel formats with alpha, namely Luminance Alpha and RGBA.

If a blend factor using source alpha is employed (i.e., one of GL_SRC_ALPHA, GL_ONE_MINUS_SRC_ALPHA and GL_SRC_ALPHA_SATURATE), then each time one or more source image channels are blended into the frame buffer, then the alpha channel of the source image must also be supplied along with the color channel.

The method of the invention is now described with respect to FIGS. 6A–6D and 7. In step 702, an appropriate frame buffer configuration is identified and allocated in memory. This frame buffer configuration is a configuration that has at least one channel at the precision desired by the user programmer.

For example, the user can call glXChooseFBConfigSGIX. As will be recognized by those skilled in the art, any OpenGL function beginning with "glX" is an OpenGL extension to the X Window System. The function glXChooseFBConfigSGIX will return a list of frame buffer configurations that are available for a specified screen.

The user must specify the connection to the X server, the specific screen, and a list of attributes. The list of attributes allow the user to define how the frame buffer is to be configured. In the present embodiment, a single frame buffer is being used to store a single channel on each pass. Preferably, the user specifies a size for a single channel frame buffer. This can be accomplished, for example, by setting GLX_RED_SIZE to 12 (for 12 bits), and GLX_GREEN_SIZE, GLX_BLUE_SIZE and GLX_ALPHA_SIZE to 0.

If a destination blend factor is being employed, then a frame buffer with at least one color and the alpha channel must be allocated. This can be accomplished, for example, by setting GLX_RED_SIZE to 12 and GLX_ALPHA_SIZE to 12, respectively, and GLX_BLUE_SIZE and GLX_GREEN_SIZE to 0, respectively.

As illustrated below, it is unimportant which channel is depicted because only a single frame buffer is used, and the blending for all four channels occurs therein sequentially. In each pass of the algorithm another channel is blended, and the results of all of the passes will be combined together. Of the list of available frame buffer configurations returned by the function, the first one fits the user's specifications most accurately. Preferably, the first frame buffer is the one used.

Figure 6A:
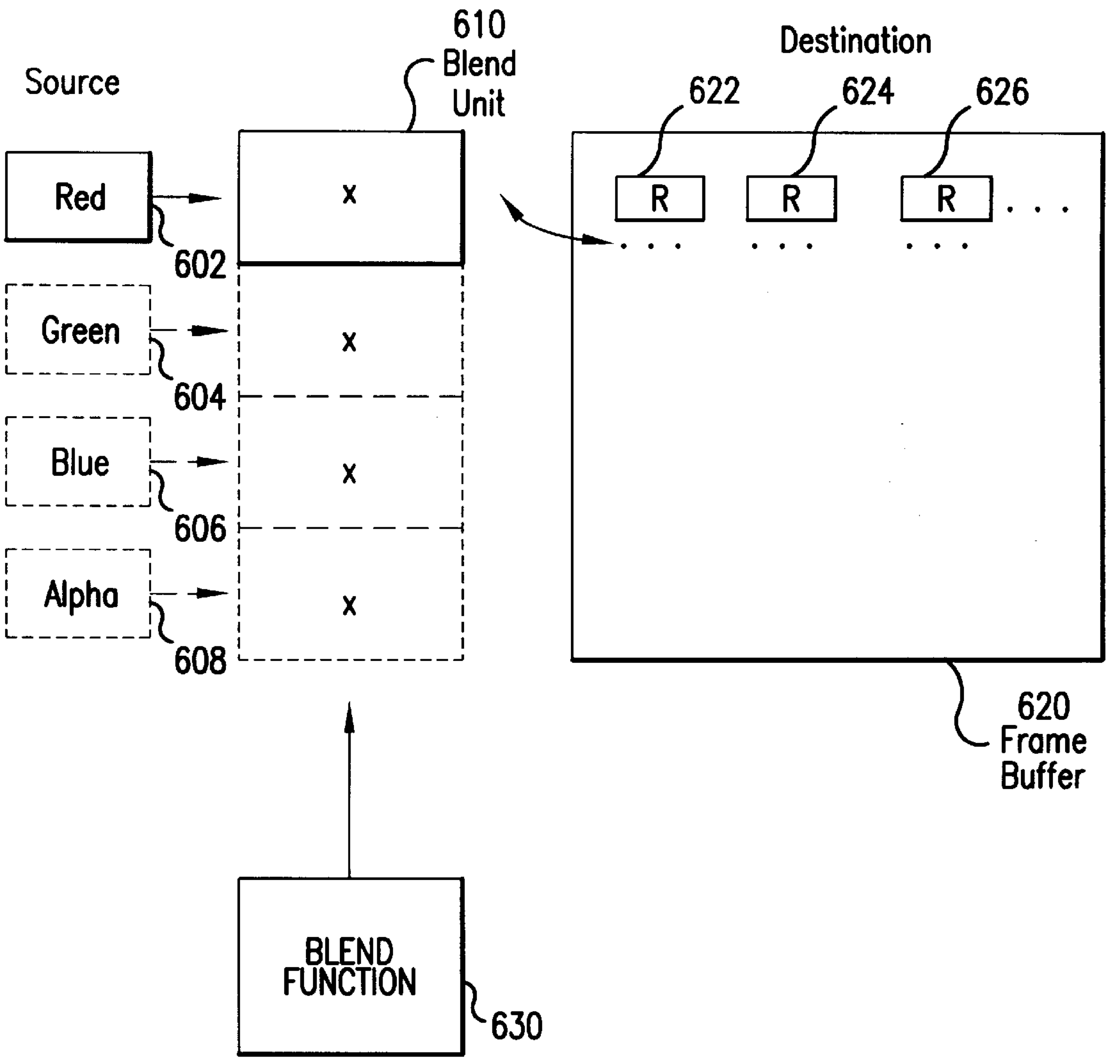
FIGS. 6A, 6B, 6C and 6D together illustrate an exemplary color blending environment for the present invention.

Next, the frame buffer configuration chosen from the list of frame buffer configurations must be allocated in memory. For example, the user can call the function glXCreateGLXbufferSGIX to create a single GLX pixel buffer (frame buffer). The user specifies the X server, the configuration (returned by the glXChooseFBConfigSGIX function), the width and height of the pixel buffer, and the attributes of the pixel buffer. As a result, a single GLX pixel buffer is allocated in memory. FIG. 6A illustrates an exemplary color blending environment for the present invention. The allocated pixel buffer is shown therein as frame buffer 620.

Subsequently, an appropriate OpenGL context is chosen. The OpenGL context pertains to the setting of an OpenGL state for the present method. As it is known, those of ordinary skill will recognize how to set an appropriate OpenGL context.

In step 704, a first channel of the destination image is written into the frame buffer. The destination image has pixels that include all four channels. Initially, the bits for the different channels are divided into their respective channels, and stored in memory separately. This is accomplished in a known manner, using any standard programming language to separate the bits for the different channels. As a result, the channels are divided into separate memory locations. In the first example pass of the method, the memory location with the red channel is used.

However, as noted, the case where the destination alpha blend factor is employed is treated differently. Here, both the first channel (i.e., a color channel) and the alpha channel of the destination image must be written to the frame buffer. The N-channel image must be separated into N separate pairs of channels, one of the elements of each pair being the color channel and the other element being the alpha channel, e.g., the red channel plus the alpha channel are written to a first frame buffer, the blue channel plus the alpha channel are written to a second frame buffer, etc. This way, it is possible to write the color channel and the associated alpha channel using the LUMINANCE_ALPHA GL pixel format.

In a preferred embodiment, the function glDrawPixels is used to write the pixels 622–626 (in blocks) from the memory location storing the destination red channel into the allocated frame buffer 620. The user specifies the width and height of the pixel block, the format of the pixel data, the pixel data type, and the location of the frame buffer 620. In the present embodiment, the user must specify a single color as the format, e.g., GL_RED. On the other hand, if the above-noted destination alpha blending factor is to be used, then the GL_LUMINANCE_ALPHA format will be specified. This same format can be used in all subsequent blends, even for example if the green channel is specified. Again, the reason for this is that each pass of the algorithm blends only a single channel, versus the known method of blending all the channels at once.

After the first pass of the algorithm, the blend function should be disabled (e.g., via glDisable) before this writing of the destination channel into frame buffer 620 occurs. It is necessary that the results of each blending pass not be mixed together at this point. This will become apparent to those skilled in the art from the following discussion.

In step 706, the frame buffer is configured to perform a desired blending function. A call is made to glBlendFunc to specify the source blend factor and the destination blend factor. As noted, the source blend factor and the destination blend factor are used by OpenGL to calculate a blend function, shown as equations (1)–(4). FIG. 6A shows the blend function as element 630. The blend function must be enabled at this point via a call to glEnable.

In step 708, the red channel 602 of the source is blended with the contents of the frame buffer 620. Symbolically, the blend function 630 (specifically equation (1)) is applied to the source red channel 602 and the destination red channel 622, and the two results are added to create the new value for the destination red channel pixel 622. However, if the destination alpha blending factors are being used, then the red and alpha channels will be blended together with the contents of the frame buffer 620 in a similar manner. In other words, here the blend function 630 is applied to (1) the source red channel and the source alpha channel, and (2) the destination red channel and the destination alpha channel, and the results are added to create the new value for the destination red channel and destination alpha channel pixel.

In one embodiment, the function glDrawPixels is used to perform the blending. The user can specify the same fields as noted above, when glDrawPixels was used to write the destination red channel into frame buffer 620. Because glBlendFunc has been enabled, a blending of the source red channel 602 with the contents of the frame buffer 620 occurs. It is important to note that any other conceivable function or sequence of functions that will draw pixels into frame buffer 620 can be used in lieu of glDrawPixels. In fact, in a preferred embodiment, a textured polygon is used in this blending step, to allow for faster processing. Those skilled in the art will recognize the tremendous variations possible.

In step 710, the contents of the frame buffer 620 are read into a memory location. The glReadPixels command can be used, where the user specifies the coordinates of the first pixel to be read, the dimensions of the pixel block (width, height), the format of the pixel data (preferably GL_RED, or another single channel), the pixel data type, etc.

Figure 6B:
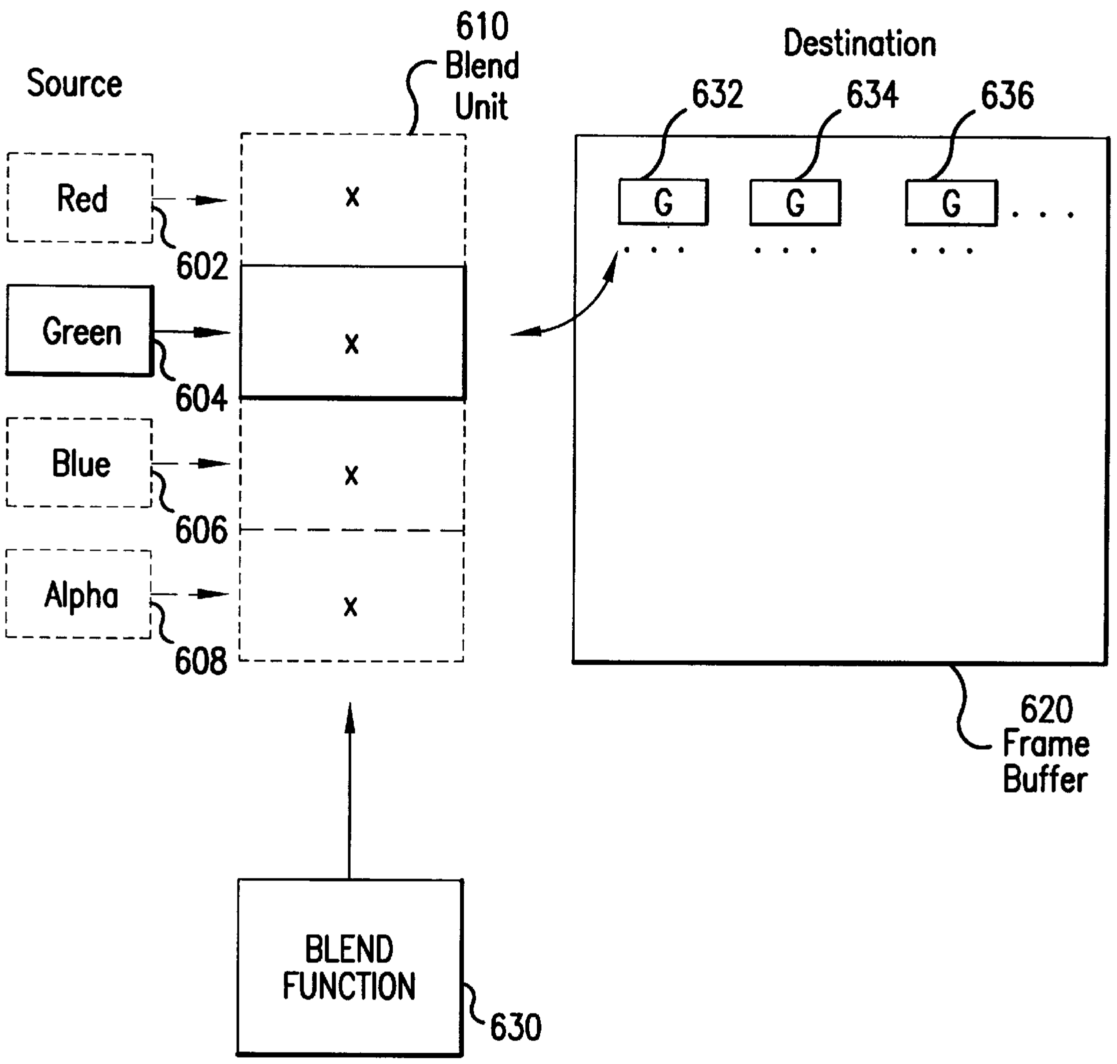
Figure 6C:
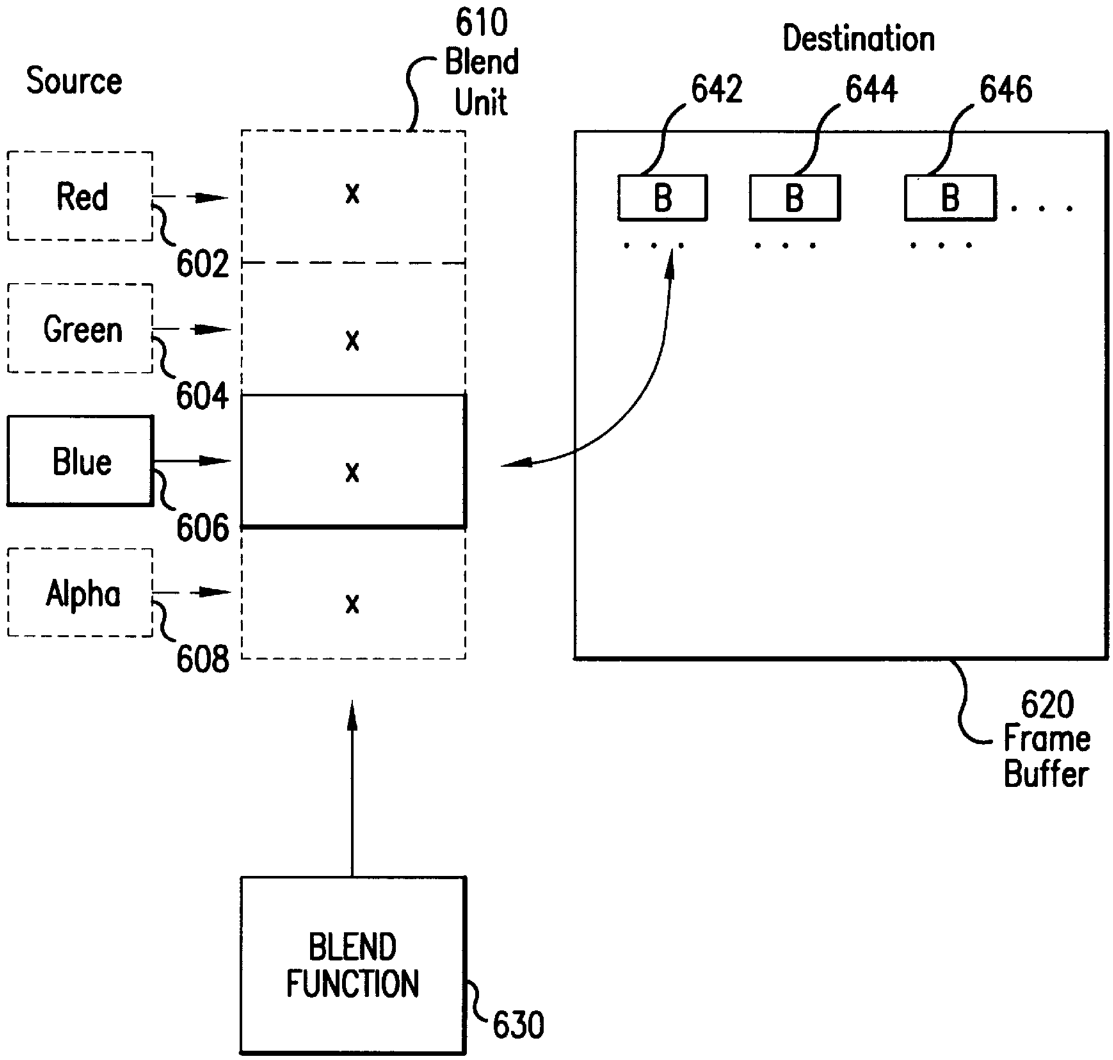
Figure 6D:
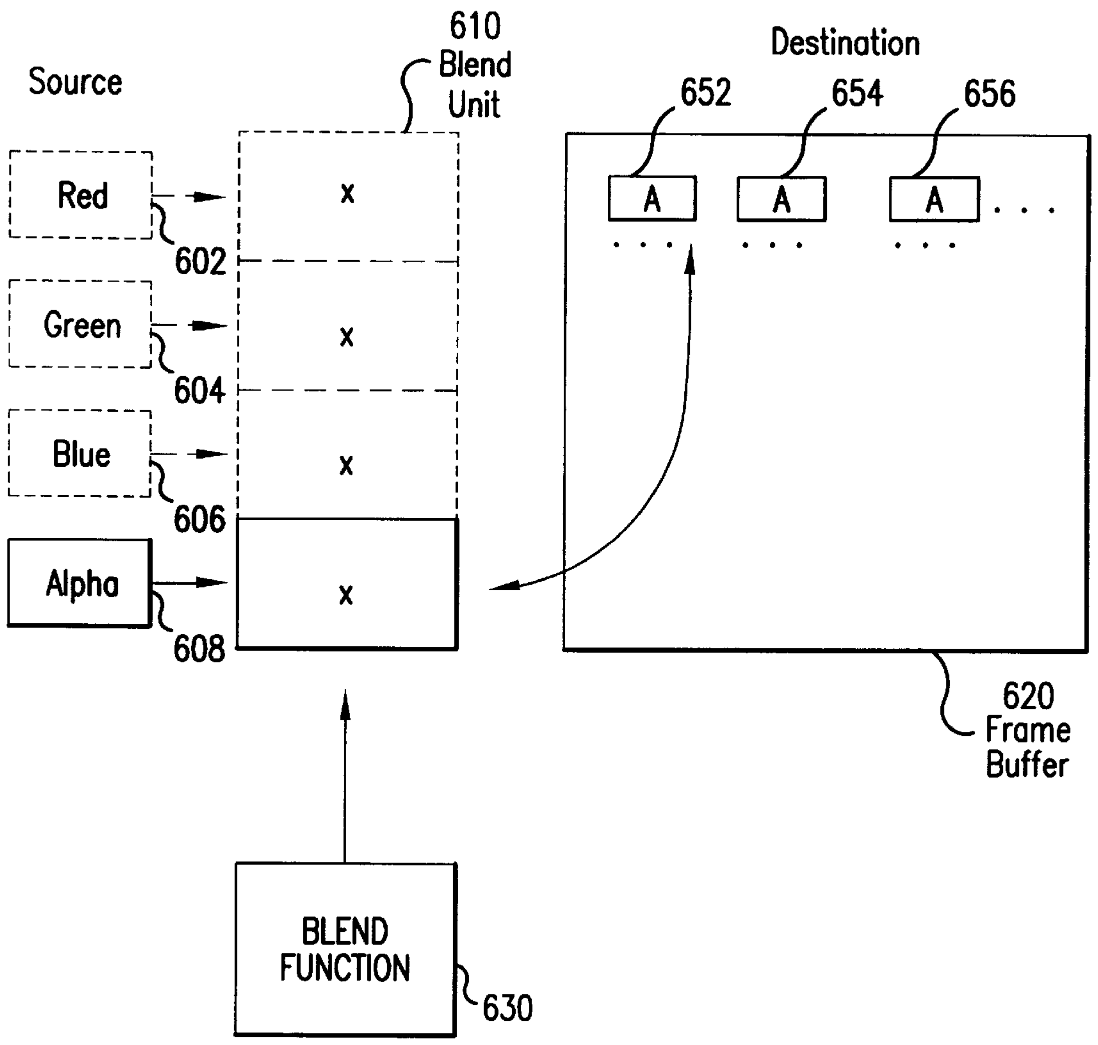

In step 712, steps 704 through 710 are repeated for the other channels. As shown in FIGS. 6B–6D, in each pass a different channel is blended. The results of each blend are stored in different memory locations in step 612.

Finally, in step 714 the results of the blends are combined into a single image. Specifically, the pixel data from the different memory locations are interleaved together to form pixels having all four channels. For example, the pixels 622 (FIG. 6A), 632 (FIG. 6B), 642 (FIG. 6C) and 652 (FIG. 6D) are combined into the first pixel of the resulting combined image. As will be recognized by those skilled in the art, if a blend factor using destination alpha has been used, then the alpha channel pixel data can be retrieved from any of the memory locations with combined channels (e.g., red channel and destination alpha channel). This interleaving of the pixel data can be performed in any known manner, using any standard programming language to recombine the bits.

IV. An Implementation of the Invention

Figure 8:
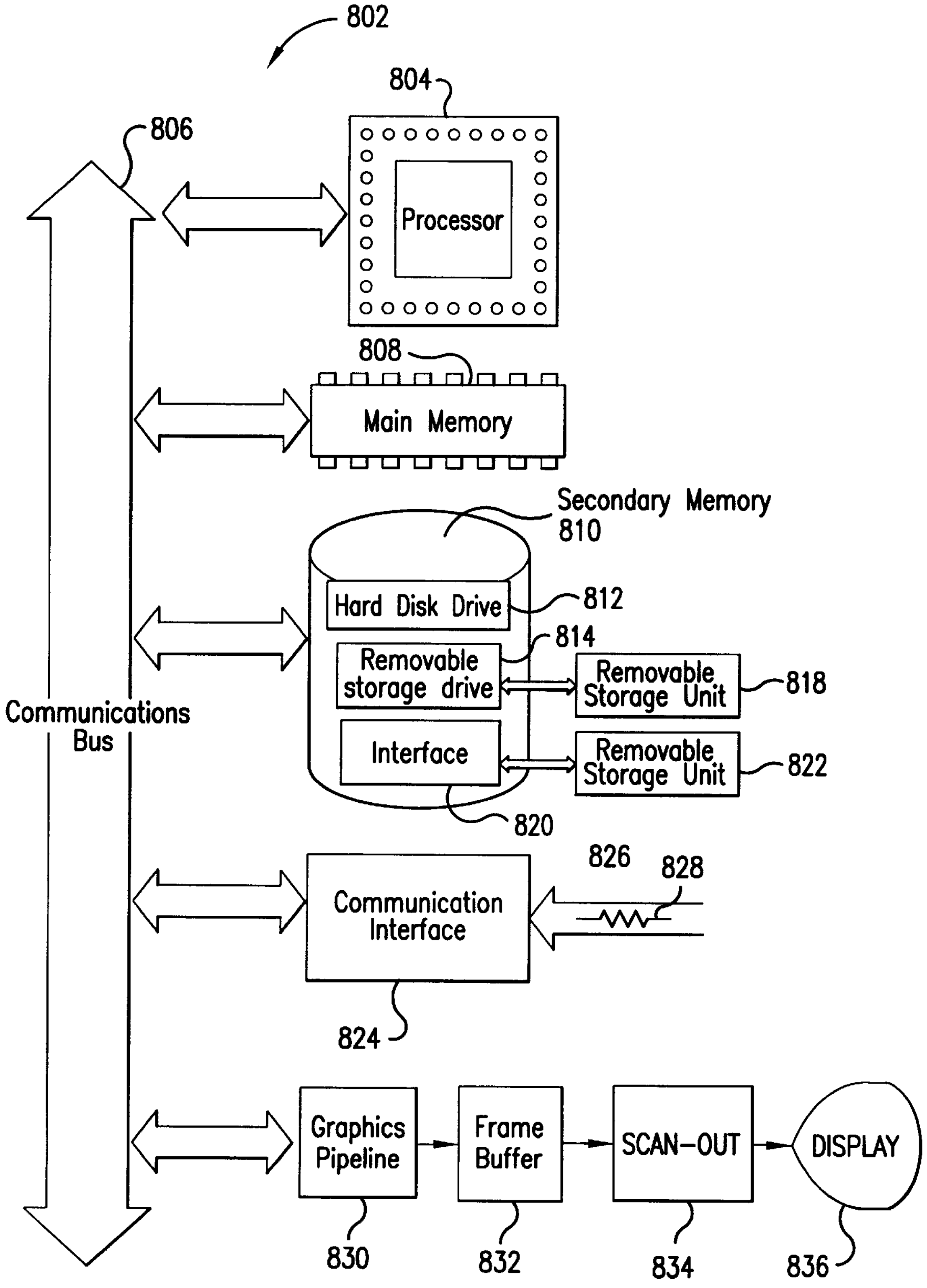
FIG. 8 illustrates a block diagram of a computer useful for implementing elements of the present invention.

As stated above, the invention may be implemented using hardware, software or a combination thereof and may be implemented in a computer system or other processing system. In fact, in one embodiment, the invention is directed toward a computer system capable of carrying out the functionality described herein. An example computer system 802 is shown in FIG. 8. The computer system 802 includes one or more processors, such as processor 804. The processor 804 is connected to a communication bus 806. Various software embodiments are described in terms of this example computer system. After reading this description, it will become apparent to a person skilled in the relevant art how to implement the invention using other computer systems and/or computer architectures.

Computer system 802 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 802. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 818 to computer system 802.

Computer system 802 can also include a communications interface 824. Communications interface 824 allows software and data to be transferred between computer system 802 and external devices. Examples of communications interface 824 can include a modem, a network interface (such as an Ethernet card), a communications port, a PCMCIA slot and card, etc. Software and data transferred via communications interface 824 are in the form of signals which can be electronic, electromagnetic, optical or other signals capable of being received by communications interface 824. These signals 826 are provided to communications interface via a channel 828. This channel 828 carries signals 826 and can be implemented using wire or cable, fiber optics, a phone line, a cellular phone link, an RF link and other communications channels.

Computer system 802 can also includes a graphics pipeline 830. The graphics pipeline comprises the hardware and software that take input commands and produce therefrom data in the format of pixels. The pixels are output to frame buffer 832. Frame buffer 832 varies from a simple buffer capable of storing two-dimensional images, to a state-of-the-art device capable of displaying textured, three-dimensional, color images. Scan-out device 834 comprises rendering hardware that selectively reads the pixels from frame buffer 832 and transmits the pixels to display 836. Display 836, comprising for example a cathode ray tube (CRT), provides a physical display of the pixels. The scan-out device 834 and display 836 comport in function with the sophistication of the frame buffer 832.

In this document, the terms "computer program medium" and "computer usable medium" are used to generally refer to media such as removable storage device 818, a hard disk installed in hard disk drive 812, and signals 626. These computer program products are means for providing software to computer system 802.

Computer programs (also called computer control logic) are stored in main memory and/or secondary memory 810. Computer programs can also be received via communications interface 824. Such computer programs, when executed, enable the computer system 802 to perform the features of the present invention as discussed herein. In particular, the computer programs, when executed, enable the processor 804 to perform the features of the present invention. Accordingly, such computer programs represent controllers of the computer system 802.

In an embodiment where the invention is implement using software, the software may be stored in a computer program product and loaded into computer system 802 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While the invention has been particularly shown and described with reference to preferred embodiments thereof, it will be understood by those skilled in the relevant art that various changes in form and details may be made therein without departing from the spirit and scope of the invention.

What is claimed is:

1. A method for performing an N channel blending operation between a source image and a destination image using a frame buffer having at least one but less than N channels, the method comprising the steps of:

(a) decomposing the N channel blending operation into a plurality k of blending operations, where k is less than or equal to N;

(b) blending at least one channel of the source image with at least one corresponding channel of destination image to produce at least one blended channel in the frame buffer;

(c) retrieving said at least one blended channel from said frame buffer and storing said at least one blended channel in a memory to permit at least one of the less than N channels of said frame buffer to be used for blending another channel of said source image in a subsequent blending step; and (d) repeating steps (b) and (c) for said plurality k of blending operations to produce a blended image.

2. The method according to claim 1, further comprising the steps of:

identifying said frame buffer configuration to have at least one channel at a desired precision;

writing at least one channel of the destination image into said frame buffer; and configuring said frame buffer to perform a blending operation on said at least one channel.

3. The method according to claim 2, wherein said identifying step comprises:

using an OpenGL GLX command to retrieve a list of frame buffer configurations; and using an OpenGL GLX command to allocate said frame buffer.

4. The method according to claim 2, wherein said identifying step comprises:

if a blend factor employing a destination image alpha channel is used, then selecting said frame buffer to have at least two channels wherein one of said two channels is said destination image alpha channel.

5. The method according to claim 2, wherein said writing step comprises:

using an OpenGL command to read pixel data of the destination image from a memory means and write said pixel data into said frame buffer.

6. The method according to claim 2, wherein said writing step comprises:

if a blend factor employing a destination image alpha channel is used, then writing at least two channels into said frame buffer wherein one of said two channels is said destination image alpha channel.

7. The method according to claim 2, wherein said configuring step comprises:

using an OpenGL command to set a blending function.

8. The method according to claim 7, wherein said blending function is a function of a source image blend factor, said source image blend factor comprising one of:

GL_ONE;

GL_ZERO;

GL_DST_COLOR;

GL_ONE_MINUS_DST_COLOR;

GL_SRC_COLOR;

GL_ONE_MINUS_SRC_COLOR;

GL_SRC_ALPHA;

GL_DST_ALPHA;

GL_ONE_MINUS_SRC_ALPHA;

GL_ONE_MINUS_DST_ALPHA; and

GL_SRC_ALPHA_SATURATE.

9. The method according to claim 7, wherein said blending function is a function of a destination image blend factor, said destination image blend factor comprising one of:

GL_ONE;

GL_ZERO;

GL_DST_COLOR;

GL_ONE_MINUS_DST_COLOR;

GL_SRC_COLOR;

GL_ONE_MINUS_SRC_COLOR;

GL_SRC_ALPHA;

GL_DST_ALPHA;

GL_ONE_MINUS_SRC_ALPHA;

GL_ONE_MINUS_DST_ALPHA; and

GL_SRC_ALPHA_SATURATE.

10. The method according to claim 1, wherein step (b) comprises:

using an OpenGL command to read pixel data of the source image from memory and blend said pixel data into said frame buffer.

11. The method according to claim 1, wherein step (b) comprises:

using an OpenGL command to render textured polygons and blend said textured polygons into said frame buffer.

12. The method according to claim 1, wherein step (b) comprises:

if a blend factor employing a source image alpha channel is used, then blending said source image alpha channel with one or more source image color channels each time said one or more source image color channels are blended into said frame buffer.

13. The method according to claim 1, wherein step (c) further comprises:

using an OpenGL command to store pixel data from said frame buffer into said memory.

14. The method according to claim 1, wherein said blended image includes at least one blended color channel and a blended alpha channel, further comprising the step of:

interleaving the at least one blended color channel and the blended alpha channel to form each pixel of an N channel destination image.

15. The method of claim 1, wherein the source image includes R, G, B and Alpha channels and the frame buffer includes only R, G and B channels, said decomposing step comprising:

decomposing said N channel blending operation into a first blending operation including at least one channel selected from the group consisting of said R, G, B and Alpha channels, and a second blending operation including the remaining ones of said R, G, B and Alpha channels.

16. A system for performing an N channel blending operation between a source image and a destination image stored in a frame buffer having at least one but less than N channels, the system comprising:

means for decomposing the N channel blending operation into a plurality k of blending operations where k is less than or equal to N;

means for blending at least one channel of the source image with at least one corresponding channel of the destination image to produce at least one blended channel in the frame buffer;

means for retrieving said at least one blended channel from said frame buffer and storing said at least one blended channel in a memory to permit at least one of the less than N channels of said frame buffer to be used for blending another channel of said source image in a subsequent blending step; and means for causing said blending means and said retrieving and storing means to repeat said blending and said storing operations k times until all N channels are blended.

17. The system according to claim 16, further comprising:

means for identifying a frame buffer configuration to have at least one channel at a desired precision;

means for writing at least one channel of the destination image into said frame buffer; and means for configuring said frame buffer to perform the N channel blending operation.

18. The system according to claim 17, wherein said identifying means comprises:

means for retrieving a list of frame buffer configurations; and means for allocating said frame buffer.

19. The system according to claim 16, wherein said blending means comprises:

means for reading pixel data of at least one channel of the source image and at least one corresponding channel of the destination image from memory and blending said pixel data into said frame buffer.

20. The system according to claim 16, wherein said blended channels include at least one blended color channel and a blended alpha channel, and wherein said system further comprises:

means for interleaving the at least one blended color channel and the blended alpha channel to form each pixel of an N channel destination image.

21. A system for performing an N channel blending operation comprising:

a processor;

a frame buffer;

a blend unit;

a memory device for storing a source image having N channels and a destination image also having N channels;

means for causing said processor to decompose the N channel blending operation into a plurality k of blending operations, where k is less than or equal to N;

means for blending at least one channel of the source image with at least one corresponding channel of the destination image to produce at least one blended channel and for storing said at least one blended channel in said frame buffer;

means for causing said processor to retrieve said at least one blended channel from said frame buffer and to store said at least one blended channel in memory;

means for causing said processor to repeat said blending and storing in memory functions k times until all channels of said source and destination images are blended and stored in memory; and means for causing said processor to combine said blended channels into a single, N channel destination image stored in memory.

22. A computer program product for performing an N channel blending operation between a source image and a destination image stored in a frame buffer having less than N channels, wherein said computer program product comprises a computer useable medium having computer program logic stored therein, said computer program logic comprises:

means for enabling a computer to decompose the N channel blending operation into plurality k of blending operations, where k is less than or equal to N;

means for enabling a computer to blend at least one channel of the source image with at least one corresponding channel of the destination image to produce at least one blended channel in the frame buffer;

means for enabling a computer to retrieve said at least one blended channel from the frame buffer and store said at least one blended channel in a memory to permit at least one of said less than N channels of said frame buffer to be used for blending another channel of said source image in a subsequent blending step; and means for enabling a computer to repeat said blending and said retrieving and storing operations k times until all N channels are blended.

* * * * *